US009111217B2

(12) United States Patent
Garvey et al.

(10) Patent No.: US 9,111,217 B2
(45) Date of Patent: Aug. 18, 2015

(54) COMPUTERIZED METHODS FOR ANALYZING COMPETING AND NON-COMPETING HYPOTHESES

(75) Inventors: Paul Raphael Garvey, Duxbury, MA (US); John Denis Crowley, Jr., Concord, MA (US); Bruce W. Lamar, Lexington, MA (US)

(73) Assignee: Mitre Corporation, McLean, VA (US)

( * ) Notice: Subject to any disclaimer, the term of this patent is extended or adjusted under 35 U.S.C. 154(b) by 691 days.

(21) Appl. No.: 12/860,590

(22) Filed: Aug. 20, 2010

(65) Prior Publication Data

US 2012/0047104 A1 Feb. 23, 2012

(51) Int. Cl.
*G06N 5/04* (2006.01)

(52) U.S. Cl.
CPC .................................. *G06N 5/04* (2013.01)

(58) Field of Classification Search
None
See application file for complete search history.

(56) References Cited

U.S. PATENT DOCUMENTS

| 8,140,464 | B2 * | 3/2012 | Sanfilippo et al. | 706/52 |
| 2007/0005523 | A1 * | 1/2007 | Maren | 706/14 |
| 2007/0288418 | A1 * | 12/2007 | Pope et al. | 706/53 |
| 2010/0057645 | A1 * | 3/2010 | Lauritsen | 706/11 |

OTHER PUBLICATIONS

Ben-Bassat, "Taxonomy, Structure, and Implementation of Evidential Reasoning Models", Technical Report CSD-870005, Appears in Proceedings of the Second Conference on Uncertainty in Artificial Intelligence (UAI1986), 1986, pp. 1-18.*
Lindahl, O'Hara, Zhu, "A Multi-Agent System of Evidential Reasoning for Intelligence Analyses", AAMAS '07 Proceedings of the 6th international joint conference on Autonomous agents and multiagent systems, ACM, 2007, pp. 1434-1439.*
Finn V. Jensen and Thomas D. Nielsen, "Bayesian Networks and Decision Graphs", 2007 Springer Science+Business Media, LLC, New York, NY, Feb. 8, 2007, chapter 3, pp. 51-108.*
Andreas Juffinger, Michael Granitzer, Elisabeth Lex, "Blog Credibility Ranking by Exploiting Verified Content", WICOW '09 Proceedings of the 3rd workshop on Information credibility on the web, Apr. 20, 2009, pp. 51-57.*
Diane Cluxton, Stephen G. Eick, Jie Yun, "Hypothesis Visualization", Information Visualization, 2004. INFOVIS 2004. IEEE Symposium on, Oct. 10-12, 2004, pp. 1-2.*
Marco Valtorta, Michael Huhns, Jiangbo Dang, Hrishikesh Goradia, and Jingshan Huang, "Extending Heuer's Analysis of Competing Hypotheses Method to Support Complex Decision Analysis", Department of Computer Science and Engineering TR-2005-001, University of South Carolina, "http://www.cse.sc.edu/~mgv/reports/TR2005-01.pdf", Feb. 10, 2005, pp. 1-10.*
"Decisions With Multiple Objectives: Preferences and Value Tradeoffs", Kenney, R. L. et al., New York: John Wiley & Sons, Inc.; (1976) (p. 6).
"Strategic Decision Making: Multiobjective Decision Analysis With Spreadsheets", Kirkwood, C. W., Brooks/Cole Cengage Learning, (1997) (p. 230).

(Continued)

*Primary Examiner* — Kakali Chaki
*Assistant Examiner* — Walter Hanchak
(74) *Attorney, Agent, or Firm* — Proskauer Rose LLP

(57) ABSTRACT

Described is a system and method for analyzing competing and non-competing hypothesis. Diagnostic strength of evidence in connection with a competing hypothesis analysis is analyzed. Veracity of evidence in connection with a non-competing hypothesis analysis is analyzed.

11 Claims, 14 Drawing Sheets

(56) References Cited

OTHER PUBLICATIONS

"Measurable Multiattribute Value Functions", Dyer, J. S., et al., Operations Research, vol. 27, No. 4, (Jul.-Aug. 1979) (pp. 810-822).
"On the Theory of Scales of Measurement", Stevens, S. S., Science, New Series, vol. 103, No. 2684 (Jun. 7, 1946) (pp. 677-680).
"Value-Focused Thinking: A Path to Creative Decision Making", Keeney, R. L. et al., The Presidents and Fellows of Harvard College, Chapter 13, (1992) (pp. 232-252).
"Making Hard Decisions: An Introduction to Decision Analysis", Clemen, R. T. , The Decision Analysis Process, 2nd Edition, Pacific Grove, California: Brooks/Cole Publishing Company, (1996), (p. 5).
"Decision Analysis and Behavioral Research", von Winterfeldt D., et al., The Foundations of Decision Analysis Revisited, Cambridge UK, Cambridge University Press, (1986) (p. 51).
"Scatter Diagram", Renze, John et al., Wolfram MathWorld the web's most extensive mathematics resource, http://mathworld.wolfram.com/ScatterDiagram.html, (1 page).
"A Reconciliation Among Discrete Compromise Solutions", Kwangsun Yoon, J.Opl. Res. Soc , vol. 38, No. 3, (1987), (pp. 277-286).
"A Mathematical Theory of Communication", Claude E. Shannon, The Bell System Technical Journal, vol. 27, (Jul. Oct. 1948), (pp. 1-55).
"Analytical Methods for Risk Management: A Systems Engineering Perspective", Garvey, Paul R., Taylor , Chapman-Hall/CRC-Press, ISBN: 1584886374, (2009), (p. 51).
"Inter-Company Comparison Using Modified TOPSIS with Objective Weights", Hepu Deng et al., Computers & Operations Research 27 (2000) (pp. 963-973).

* cited by examiner

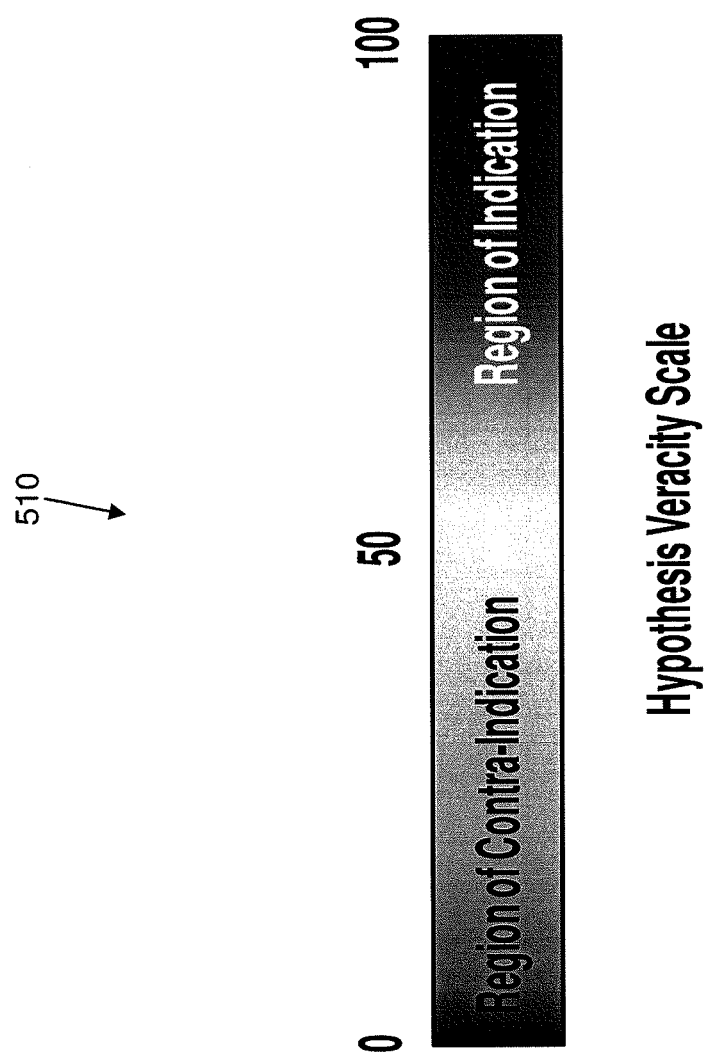

COMPUTERIZED METHODS FOR ANALYZING COMPETING AND NON-COMPETING HYPOTHESES

GOVERNMENT RIGHTS

The technology described herein was developed under the Sudan Strategic Assessment Project conducted for US Central Command (USCENTCOM), funded by the US Strategic Command Global Innovation and Strategy Center (USSTRATCOM GISC) and Office of the Secretary of Defense, Defense Research and Engineering (OSD DDR&E), and directed by the Joint Staff J3, as part of the Strategic Multilayer Analysis (SMA) process. The technology described herein was developed under contract number D-CPFF DID ARMY US Strategic Command Global Innovation and Strategy Center System Engineering Architecture and Integration (USSTRATCOM SYS ENG ARCH & INTEG), project number 0707S230-NF. The federal government may have rights in the technology.

FIELD OF THE INVENTION

The invention relates generally to a computerized method and system for analyzing competing and non-competing hypothesis. In one embodiment, the invention relates to analyzing diagnostic strength of evidence in connection with analyzing competing hypotheses. Diagnostic strength indicates the degree with which evidence contributes to or detracts from confirming a hypothesis. In another embodiment, the invention relates to analyzing the veracity of evidence in connection with analyzing non-competing hypothesis. The veracity of evidence indicates its credibility and reliability.

BACKGROUND OF THE INVENTION

Current methods and systems for evidence-driven hypothesis analysis rely extensively on Bayesian inference systems. Bayesian inference systems measure how an initial probability in the truth or falsity of a hypothesis may change, when evidence relating to the hypothesis is observed. An example of a Bayesian inference system is Netica Bayesian Network Software by Norsys.

While Bayesian inference systems are useful in hypothesis analysis, it is difficult to prove the accuracy of Bayesian inference systems to measure the strength in the trueness (or veracity) of a hypothesis. Even if accuracy could be ascertained, Bayesian inference system can indicate that a hypothesis has a high chance of being true, and the hypothesis proves to be false. When the hypothesis is an event, Bayesian inference systems can indicate the event has a high chance of occurrence, and the event does not occur.

Current methods for evidence-driven hypothesis analysis involve analyzing competing hypotheses. When analyzing competing hypotheses each piece of evidence has some positive or negative contribution to whether each hypothesis is indicated or contraindicated. It can be desirable to analyze hypotheses that share some but not all same evidence. This can be referred to analysis of non-competing hypotheses.

Therefore, a system for analyzing competing and non-competing hypotheses that can provide a diagnostic strength of evidence and/or verify its veracity is desired.

SUMMARY OF THE INVENTION

In one aspect, the invention features, a computerized method of analyzing diagnostic strength of evidence in connection with a competing hypothesis analysis. The method involves receiving, by a computing device, one or more hypotheses and one or more pieces of evidence, receiving, by the computing device, an evidence confirmation value for each of the one or more hypotheses for each of the one or more pieces of evidence and determining, by the computing device, a contribution value of each of the one or more pieces of evidence to confirming or disconfirming each of the one or more hypotheses, based on the evidence confirmation value. The method also involves determining, by a computing device, a diagnostic strength value for each of the one or more pieces of evidence based on the contribution value and transmitting, by the computing device, each diagnostic strength value to a display.

In another aspect, the invention features, a computerized method of analyzing veracity of evidence in connection with a non-competing hypothesis analysis. The method involves receiving, by a computing device, one or more pieces of evidence and receiving, by the computing device, an evidence credibility score and evidence reliability score for each of the one or more pieces of evidence. The method also involves determining, by the computing device, a veracity score for each of the one or more pieces of evidence based on the evidence credibility score and the evidence reliability score and transmitting, by the computing device, each veracity score to a display.

In another aspect, the invention features, a computerized method of analyzing one or more hypotheses based on evidence. The method involves determining, by a computing device, whether the one or more hypotheses are competing or non-competing based on one or more pieces of evidence and determining, by the computing device, a veracity score for each of the one or more pieces of evidence if the one or more hypotheses are non-competing. The method also involves, determining, by the computing device, a diagnostic strength value for each of the one or more pieces of evidence if the one or more hypotheses are competing and transmitting, by the computing device, at least one of the veracity scores to a display.

In some embodiments, determining the veracity score involves receiving, by the computing device, an evidence credibility score and an evidence reliability score for each of the one or more pieces of evidence, determining, by the computing device, the veracity score for each of the one or more pieces of evidence based on the evidence credibility and reliability scores, and transmitting, by the computing device, each veracity score to a display.

In some embodiments, the method involves receiving, by the computing device, an evidence veracity score for each of the one or more pieces of evidence, filtering each of the one or more pieces of evidence having a veracity score below the evidence veracity score threshold, determining, by the computing device, a hypothesis veracity score for each of the one or more of the hypothesis, and transmitting, by the computing device, each hypothesis veracity score to the display.

In some embodiments, the method involves determining the hypothesis veracity score by determining an extent that an evidence confirmation value is within a region of indication or a region of contra-indication. In some embodiments, the method involves determining, by the computing device, a mean veracity score based on the veracity scores for each of the one or more pieces of evidence, determining, by the computing device, a standard deviation veracity score based on the veracity scores for each of the one or more pieces of evidence, and transmitting, by the computing device, the mean veracity score, the standard deviation veracity score and the veracity score threshold to the display.

In some embodiments, the method involves receiving, by the computing device, an evidence statement. In some embodiments the method involves translating the evidence credibility score received by the computing device from an ordinal scale to a cardinal scale. In some embodiments, the method involves translating the evidence reliability score received by the computing device from an ordinal scale to a cardinal scale.

In some embodiments, the method involves determining diagnostic strength by receiving, by the computing device, an evidence confirmation value for each of the one or more hypotheses for the one or more pieces of evidence, determining, by the computing device, a contribution value of each of the one or more pieces of evidence to confirming or disconfirming each of the one or more hypotheses, based on the evidence confirmation value and determining, by a computing device, a diagnostic strength for each of the one or more pieces of evidence based on the contribution value.

In some embodiments, the method involves determining, by the computing device, whether each of the one or more hypotheses is indicated or contraindicated based on the evidence confirmation value and the diagnostic strength and transmitting, by the computing device, the indication or contraindication to the display.

BRIEF DESCRIPTION OF THE DRAWINGS

FIG. 5B is a graph of hypothesis veracity scores showing regions of indication and contra-indication for the hypothesis, based on the degree that a piece of evidence indicates or contra-indicates the hypothesis on a 1 to 5 ordinal scale.

DETAILED DESCRIPTION

A hypotheses analysis method and system includes two types of evidence driven hypotheses analysis: 1) analysis of competing hypotheses (ACH) and 2) analysis of non-competing hypotheses (ANCH). ACH can involve analysis of hypotheses where each item of evidence has some positive or negative influence on indicating or contraindicating each hypothesis. ANCH can involve analysis of hypotheses where each item of evidence has some positive or negative influence on indicating or contraindicating some of the hypotheses.

Figure 1:
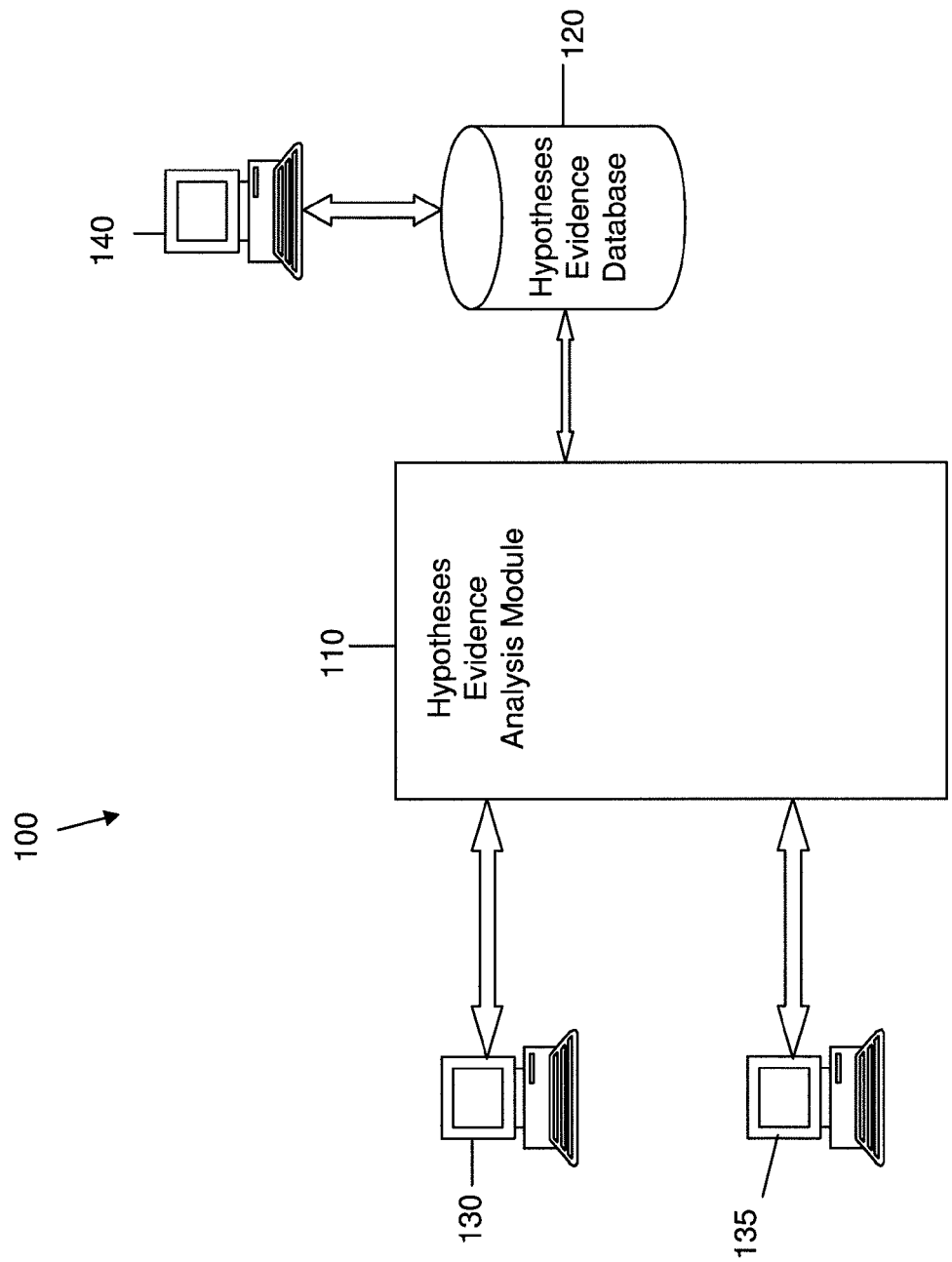
FIG. 1 is a block diagram showing an exemplary hypotheses analysis system.

FIG. 1 is a block diagram showing an exemplary hypotheses analysis system 100. The components shown here, their connections and relationships, and their functions, are meant to be exemplary only, and are not meant to limit implementations of the inventions described and/or claimed in this document.

The hypotheses analysis system 100 processes analysis of one or more hypotheses. The hypotheses analysis system 100 includes one or more computing devices 130, 135, and 140, a hypotheses evidence database 120, and a hypotheses evidence analysis module 110. Each of the components of the hypotheses analysis system 100 are interconnected using various busses, and can be mounted on a common motherboard or in other manners as appropriate. The hypotheses analysis system 100 can process instructions for execution within the hypotheses evidence analysis module 110, including but not limited to instructions stored in the hypotheses evidence analysis module 110, in the hypotheses evidence database 120 or in one or more computing devices 130, 135, and 140 to an information display for a GUI on an external input/output device, such as computing devices 130, 135, and 140. In other implementations, multiple processors and/or multiple busses can be used, as appropriate, along with multiple memories and types of memory. Multiple computing devices 130, 135, and 140 can be connected, with each device providing portions of the necessary operations (e.g., as a server bank, a group of blade servers, or a multi-processor system).

Computing devices 130, 135 and 140 are intended to represent various forms of digital computers, such as laptops, desktops, workstations, personal digital assistants, servers, blade servers, mainframes, and other appropriate computers.

The hypotheses evidence analysis module 110 can execute requests for hypotheses analysis. Requests to perform hypotheses analysis can be input through computing devices 130 and 135. The requests to perform hypotheses analysis can include information needed to perform the hypotheses analysis. The hypotheses evidence analysis module 110 performs the hypotheses analysis based on the information included in the request and/or information retrieved from the hypotheses evidence database 120.

The hypotheses evidence database 120 stores information used to analyze hypotheses. The information used to analyze hypotheses can include one or more hypotheses, one or more pieces of evidence, evidence credibility scores, evidence reliability scores, and evidence scores. The one or more hypotheses can be grouped into a hypotheses set and the one or more pieces of evidence can be grouped into an evidence set. The hypotheses set and/or the evidence set can be assigned an identifier. Hypotheses set identifiers are, for example, a name, an event, and/or an action anticipated to occur. Evidence set identifiers are, for example, information that is discovered from observation or experiment.

Figure 2:
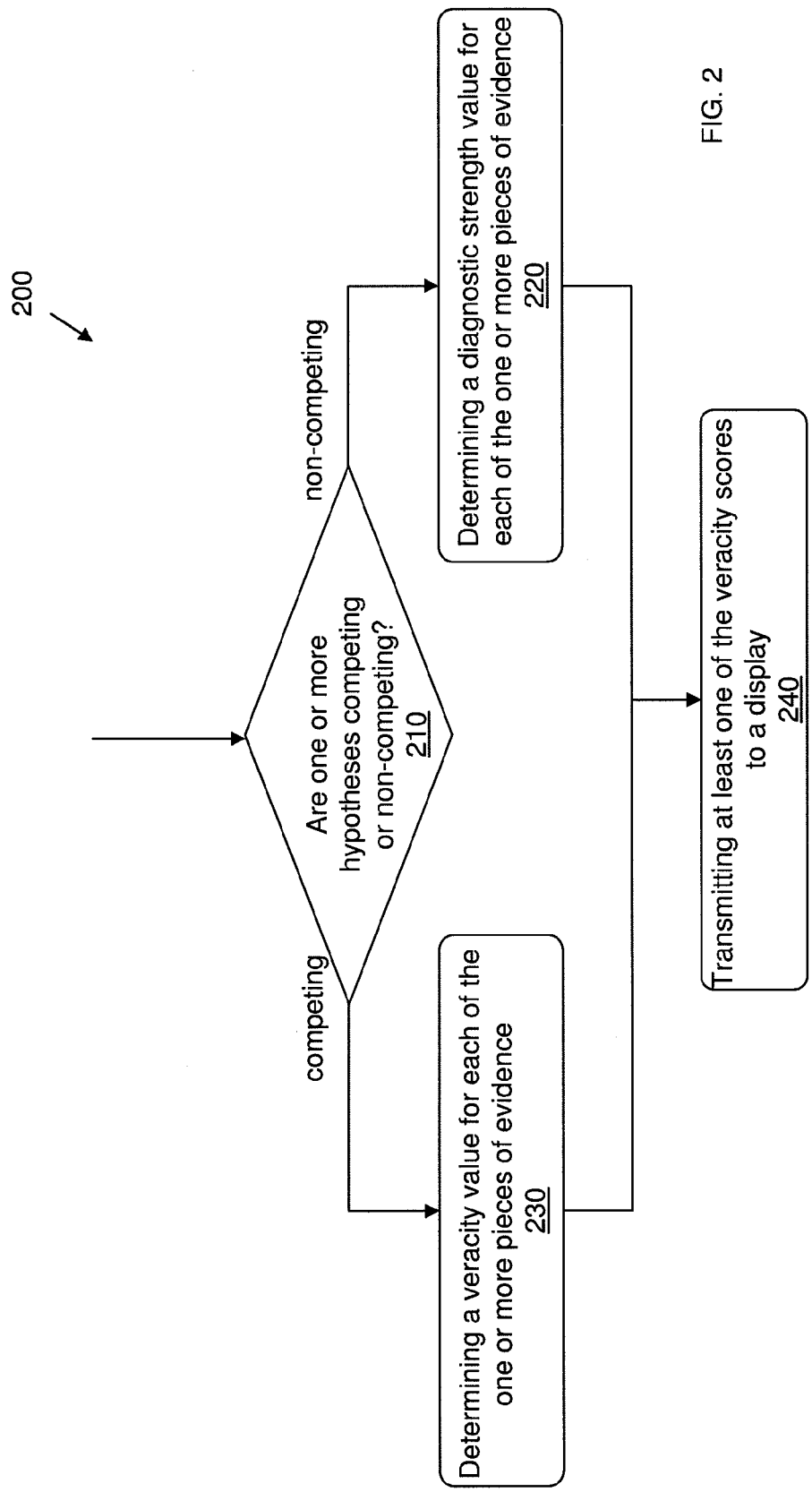
FIG. 2 is a flow chart of a method for analyzing competing and non-competing hypotheses.

FIG. 2 is a flow chart 200 of a method for analyzing competing and non-competing hypotheses. The method for analyzing competing and non-competing hypotheses includes determining whether one or more hypotheses are competing or non-competing (Step 210). The determination is made based on whether each of the one or more pieces of evidence contributes to indicating or contraindicating each hypothesis. For example, assume three pieces of evidence, $e_1$, $e_2$ and $e_3$, and three hypothesis, $h_1$, $h_2$, and $h_3$. If $e_1$ contributes to indicating or contraindicating $h_1$, $h_2$, and $h_3$, $e_2$ contributes to indicating or contraindicating $h_1$, $h_2$, and $h_3$, and $e_3$ contributes to indicating or contraindicating $h_1$, $h_2$, and $h_3$, then the analysis is of competing hypothesis because each piece of evidence ($e_1$, $e_{2\ and\ e3}$) contributes to indicating or contraindicating each hypothesis ($h_1$, $h_2$, and $h_3$). If $e_1$ contributes to indicating or contraindicating $h_1$ and $h_3$, $e_2$ contributes to indicating or contraindicating $h_1$ and $h_2$, and $e_3$ contributes to indicating or contraindicating $h_1$, $h_2$, and $h_3$, then the analysis is of non-competing hypotheses because each piece of evidence ($e_1$, $e_2$ and $e_3$) contributes to indicating or contraindicating only some of the hypotheses ($h_1$, $h_2$, and $h_3$).

If the one or more hypotheses are competing, then the method includes determining a diagnostic strength value for each of the one or more pieces of evidence (Step 220), as is discussed below in FIG. 3.

If the one or more hypotheses are non-competing, then the method includes determining a veracity score for each of the one or more pieces of evidence (Step 230), as is discussed below in FIG. 4.

The method also includes transmitting at least one of the veracity scores to a display (Step 240).

Figure 3:
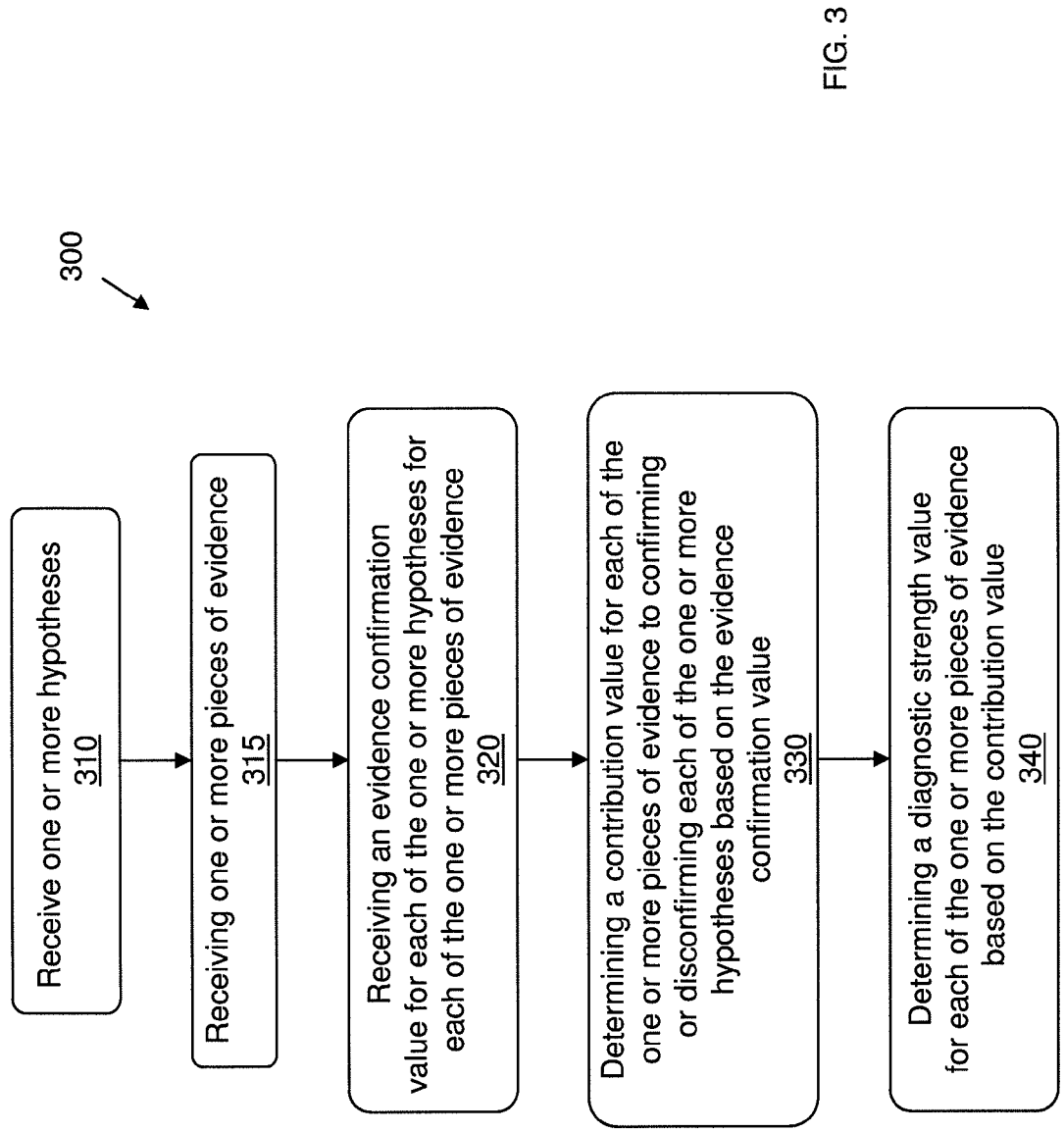
FIG. 3 is a flow chart of an exemplary method for analyzing diagnostic strength of evidence in connection with a competing hypotheses analysis.

FIG. 3 is a flow chart of an exemplary method for analyzing diagnostic strength of evidence in connection with a competing hypotheses analysis. The method includes receiving one or more hypotheses (Step 310). The method also includes receiving one or more pieces of evidence (Step 320). Both the one or more hypotheses and the one or more pieces of evidence can be retrieved from a database (e.g., hypotheses evidence database 120 of FIG. 1) or input by a user through a terminal (e.g., computing device 130 of FIG. 1).

The method also involves receiving an evidence confirmation value for each piece of evidence for each of the hypotheses (Step 320). In some embodiments, the evidence confirmation value is determined based on one or more received evidence scores for each of the pieces of evidence for each of the hypotheses and an evidence score lexicon. Table 1 illustrates the received evidence scores for each of the pieces of evidence for each of the hypotheses. Table 1 can be referred to as a hypotheses evidence (HE) matrix.

TABLE 1

| Analyst Input Matrix | Evidence 1 | Evidence 2 | Evidence 3 | Evidence 4 | Evidence 5 | Evidence 6 |
|---|---|---|---|---|---|---|
| Hypothesis A | nsd | nsd | nsd | sd | sd | vsd |
| Hypothesis B | nsd | nsd | nsd | nsd | nsd | nsd |
| Hypothesis C | nsd | sd | sd | nsd | nsd | nsd |

Table 2 illustrates an exemplary evidence score lexicon.

TABLE 2

| Analyst Lexicon | vsd = 0.95 | Evidence Very Strongly Disconfirming Hypothesis |
|---|---|---|
| | sd = 0.75 | Evidence Strongly Disconfirming Hypothesis |
| | n = 0.50 | Neutral |
| | nsd = 0.25 | Evidence Not Strongly Disconfirming Hypothesis |
| | nvsd = 0.05 | Evidence Not Very Strongly Disconfirming Hypothesis |

The evidence scores and the evidence score lexicon can be retrieved from a database (e.g., hypotheses evidence database 120 of FIG. 1) or input by a user through a terminal (e.g., computing device 130 of FIG. 1).

The method also involves determining a contribution value for each of the one or more pieces of evidence to confirming or disconfirming each of the one or more hypotheses based on the evidence confirmation values (Step 330). In some embodiments, the contribution value is determined as follows:

First, the HE matrix (e.g., hypotheses evidence matrix shown above in Table 1) is normalized. The normalization can be determined as follows:

$$r_{ij} = \frac{x_{ij}}{\sqrt{\sum_{i=1}^{m} x_{ij}^2}} \quad i = 1, \ldots, m; j = 1, \ldots, n \qquad \text{EQN. 1}$$

where $r_{ij}$ is the normalized evidence confirmation value of the jth (columns) piece of evidence associated with the ith (rows) hypothesis in the HE matrix, where $x_{ij}$ is the evidence confirmation value of jth (columns) piece of evidence associated with the ith (rows) hypothesis in the HE matrix and where evidence confirmation values for $x_{ij}$ are computed by applying the lexicon of Table 2 to Table 1. Table 3 illustrates a normalized HE matrix that results from applying EQN. 1 to Table 1 shown above.

TABLE 3

| HE Normalized Matrix | Evidence 1 | Evidence 2 | Evidence 3 | Evidence 4 | Evidence 5 | Evidence 6 |
|---|---|---|---|---|---|---|
| Hypothesis A | 0.577 | 0.302 | 0.302 | 0.905 | 0.905 | 0.937 |
| Hypothesis B | 0.577 | 0.302 | 0.302 | 0.302 | 0.302 | 0.247 |
| Hypothesis C | 0.577 | 0.905 | 0.905 | 0.302 | 0.302 | 0.247 |

Second, the contribution value for each of the one or more pieces of evidence for each of the one or more hypotheses is determined. The contribution value can be determined as follows:

$$p_{ij} = \frac{r_{ij}}{\sum_{i=1}^{m} r_{ij}} \quad i = 1, \ldots, m; j = 1, \ldots, n \qquad \text{EQN. 2}$$

where $p_{ij}$ is the contribution value of the jth (columns) piece of evidence associated with the ith (rows) hypothesis in the HE matrix, where $r_{ij}$ is the normalized evidence confirmation value of jth (columns) piece of evidence associated with the ith (rows) hypothesis in the HE matrix. Table 4 illustrates the contribution values that results from applying EQN. 2 to Table 3.

TABLE 4

| HE Probability Matrix | Evidence 1 | Evidence 2 | Evidence 3 | Evidence 4 | Evidence 5 | Evidence 6 |
|---|---|---|---|---|---|---|
| Hypothesis A | 0.333 | 0.200 | 0.200 | 0.600 | 0.600 | 0.655 |
| Hypothesis B | 0.333 | 0.200 | 0.200 | 0.200 | 0.200 | 0.172 |
| Hypothesis C | 0.333 | 0.600 | 0.600 | 0.200 | 0.200 | 0.172 |

The method also includes determining a diagnostic strength value for each of the one or more pieces of evidence based on the contribution values (Step 340). In some embodiments, the diagnostic strength value is determined as follows:

First, a diversification index $d_j$ is determined. The diversification index is a measure of the degree of distinction in the information transmitted by each item of evidence $E_j$ to each hypothesis. The diversification index can be determined as follows:

$$d_j = |1 - E_j| \quad \text{EQN. 3}$$

where $$E_j = -\frac{1}{\ln(m)} \sum_{i=1}^{m} p_{ij} \ln(p_{ij}), \, i = 1, \ldots, m; \, j = 1, \ldots, n \quad \text{EQN. 4}$$

where $p_{ij}$ is the contribution value of the jth (columns) piece of evidence associated with the ith (rows) hypothesis in the normalized HE matrix.

Finally, the diagnostic strength of each piece of evidence can be determined as follows:

$$w_j = \frac{d_j}{\sum d_j}; \, j = 1, \ldots, n \quad \text{EQN. 5}$$

where $d_j$ is the diversification index. Table 5 illustrates the diversification index that results from applying EQN. 3 and EQN. 4 to Table 4 and the diagnostic strength that result from applying EQN. 5 to the diversification index.

TABLE 5

|  | Evidence 1 | Evidence 2 | Evidence 3 | Evidence 4 | Evidence 5 | Evidence 6 |
|---|---|---|---|---|---|---|
| Diversification Index | 0.000 | 0.135 | 0.135 | 0.135 | 0.135 | 0.195 |
| Diagnostic Strength | 0.000 | 0.183 | 0.183 | 0.183 | 0.183 | 0.266 |

In some embodiments, the diagnostic strength can be used to determine whether each of the hypothesis is indicated or contraindicated as follows:

Each entry in the normalized HE matrix is weighted by the diagnostic strength. In one embodiment, the normalized HE matrix is weighted as follows:

$$v_{ij} = w_j r_{ij}; i=1, \ldots, m; j=1, \ldots, n \quad \text{EQN. 6}$$

where $v_{ij}$ is the weighted normalized computed hypotheses value of the jth (columns) piece of evidence associated with the ith (rows) hypothesis in a weighted normalized HE matrix and $r_{ij}$ is the normalized evidence confirmation value of the jth (columns) piece of evidence associated with the ith (rows) hypothesis in the normalized HE matrix. Table 6 illustrates the weighted normalized evidence confirmation values that result from applying EQN. 6 and Table 5 to Table 2.

TABLE 6

| Weighted Normalized HE matrix | Evidence 1 | Evidence 2 | Evidence 3 | Evidence 4 | Evidence 5 | Evidence 6 |
|---|---|---|---|---|---|---|
| Hypothesis A | 0.000 | 0.055 | 0.055 | 0.165 | 0.166 | 0.250 |
| Hypothesis B | 0.000 | 0.055 | 0.055 | 0.055 | 0.055 | 0.066 |
| Hypotheses C | 0.000 | 0.166 | 0.166 | 0.055 | 0.055 | 0.066 |

Ideal and nadir vectors can be determined. In one embodiment, the ideal ($S^+$) and nadir ($S^-$) vectors are determined as follows:

$$S^+ = \{v_1^*, v_2^*, \ldots, v_j^*, \ldots, v_n^*\} = \quad \text{EQN. 7}$$
$$\left\{\left(\max_i v_{ij} \mid j \in J_1\right), \left(\min_i v_{ij} \mid j \in J_2\right) \mid i = 1, \ldots, m\right\}$$

$$S^- = \{v_1^-, v_2^-, \ldots, v_j^-, \ldots, v_n^-\} = \quad \text{EQN. 8}$$
$$\left\{\left(\min_i v_{ij} \mid j \in J_1\right), \left(\max_i v_{ij} \mid j \in J_2\right) \mid i = 1, \ldots, m\right\}$$

where $J_1$ is the set of beneficial attributes and $J_2$ is the set of non-beneficial attributes, and $v_{ij}$ is the weighted normalized evidence confirmation value of the jth (columns) piece of evidence associated with the ith (rows) hypothesis in the weighted normalized HE matrix.

Euclidean separation measures are determined. In one embodiment, the Euclidean separation measures ideal ($D^+$) and nadir ($D^-$) are determined as follows:

$$D_i^+ = \sqrt{\sum_{j=1}^{n} (v_{ij} - v_j^*)^2} \quad i = 1, \ldots, m \quad \text{EQN. 9}$$

$$D_i^- = \sqrt{\sum_{j=1}^{n} (v_{ij} - v_j^-)^2} \quad i = 1, \ldots, m \quad \text{EQN. 10}$$

where $v_{ij}$ is the weighted normalized evidence confirmation value of the ith (columns) hypotheses associated with the jth (rows) of pieces of evidence in the weighted normalized HE matrix. Table 7 illustrates the ideal ($S^+$) and nadir ($S^-$) values that result from applying EQN. 7 and EQN. 8 to Table 6 and the Euclidean separation measures ideal ($D^+$) and nadir ($D^-$) that result from applying EQN. 9 and EQN. 10 to Table 6.

TABLE 7

|  | Evidence 1 | Evidence 2 | Evidence 3 | Evidence 4 | Evidence 5 | Evidence 6 |
|---|---|---|---|---|---|---|
| S+ Ideal Disconfirming Vector | 0.000 | 0.166 | 0.166 | 0.166 | 0.166 | 0.250 |
| S− Nadir Disconfirming Vector | 0.000 | 0.055 | 0.055 | 0.055 | 0.055 | 0.066 |

|  | Hypothesis A | Hypothesis B | Hypothesis C |
|---|---|---|---|
| D+ Euclidean Separation/Distance | 0.156 | 0.288 | 0.241 |
| D− Euclidean Separation/Distance | 0.241 | 0.000 | 0.156 |

Disconfirmation scores are determined. In one embodiment, the disconfirmation scores are determined as follows:

$$0 \leq C_i^* = \frac{S_i^-}{(S_i^* + S_i^-)} \leq 1 \quad i = 1, \ldots, m \quad \text{EQN. 11}$$

where $C_i^*$ is the disconfirmation score for each hypotheses and $S^+$ is the ideal vector and $S^-$ is the nadir vectors. Table 8 illustrates the disconfirmation scores that result by applying EQN. 11 to Table 7.

TABLE 8

|  | Hypothesis A | Hypothesis B | Hypothesis C |
|---|---|---|---|
| RESULTS | 0.607 | 0.000 | 0.393 |

Hypothesis With Smallest Score is Least Disconfirmed by The Evidence
Hypothesis With Largest Score is Most Disconfirmed by The Evidence The hypothesis with smallest score in Table 8 (Hypothesis B) is least disconfirmed by the evidence, thus it is most strongly indicated. The hypothesis with largest score in Table 8 (Hypothesis A) is most disconfirmed by the evidence, thus it is the most strongly contraindicated.

Figure 4:
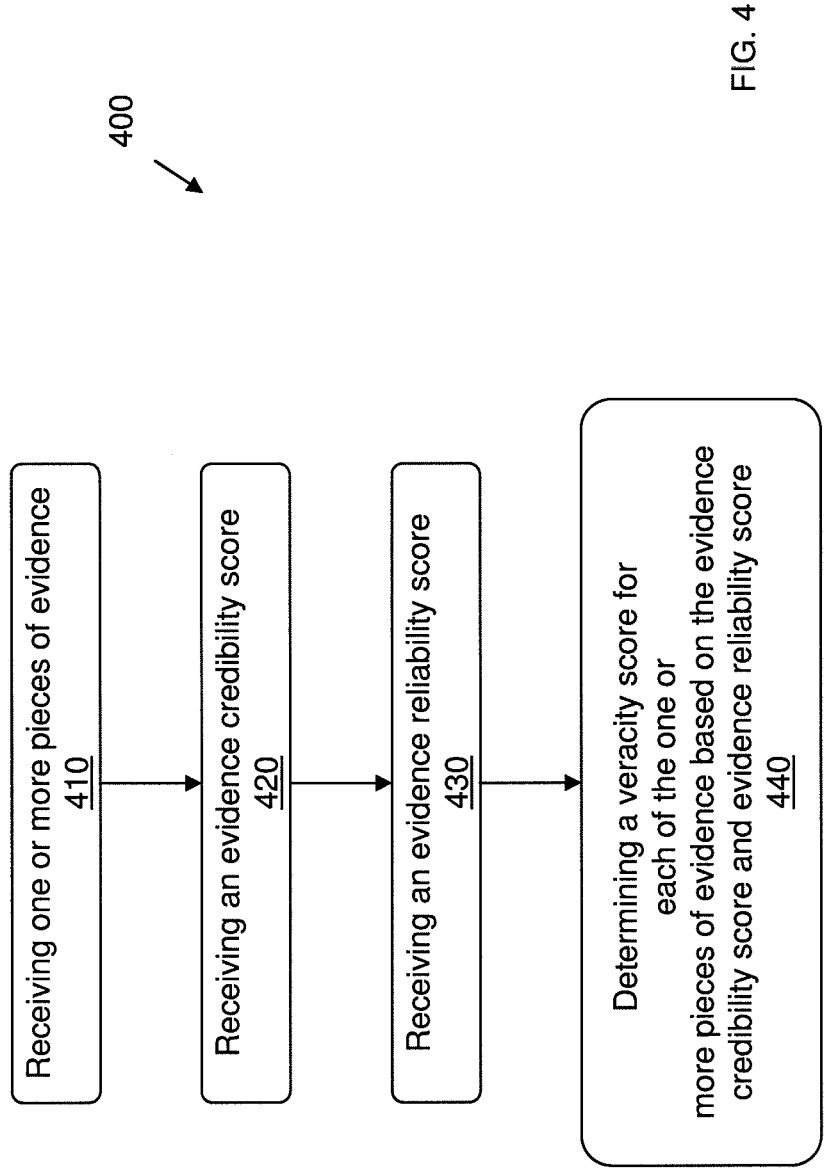
FIG. 4 is a flow chart of an exemplary method for analyzing the veracity of evidence in connection with a non-competing hypotheses analysis.

FIG. 4 is a flow chart of an exemplary method for analyzing the veracity of evidence in connection with a non-competing hypotheses analysis. The method includes receiving one or more pieces of evidence (Step 410).

The method also includes receiving an evidence credibility score (Step 420). Table 9 illustrates an evidence credibility score lexicon, according to one embodiment of the invention.

TABLE 9

| Ordinal Scale Rating Level | Definition Information Credibility | Cardinal Interval Scale Rating Level |
|---|---|---|
| Very High 5 | BLUE The situation is, or circumstances are, such that the source, at this reporting date, is believed to have extremely good credibility. | 80 to 100 Midpt = 90 |
| High 4 | GREEN The situation is, or circumstances are, such that the source, at this reporting date, is believed to have quite good credibility. | 60 to <80 Midpt = 70 |
| Moderate 3 | YELLOW The situation is, or circumstances are, such that the source, at this reporting date, is believed to have so-so credibility. | 40 to <60 Midpt = 50 |
| Low 2 | ORANGE The situation is, or circumstances are, such that the source, at this reporting date, is believed to have slightly poor credibility. | 20 to <40 Midpt = 30 |
| Very Low 1 | RED The situation is, or circumstances are, such that the source, at this reporting date, is believed to have extremely poor credibility. | 0 to <20 Midpt = 10 |

Definition of "Source": The originating basis from which information is produced. This can include human produced reporting, model produced findings, publications/documents, open source research, etc. In this context, credibility refers to the capacity for belief in the information provided by the source, independent of the source's reliability. Factors to consider include (but are not limited to) the position of the source to know, provide, or generate the information being reported, how well the source generating this information is known or recognized in the community, and the overall intrinsic plausibility of the information. The values shown in the right column reflect a measure of the "strength" of the rating. In this case, it reflects a measure of the "strength" of the capacity for belief. The choice of a rating is not arbitrary. The situation or circumstances that support the selection of a rating should be documented by arguments and evidence justifying the basis for the selection.

The method also includes receiving an evidence reliability score (Step 430). Table 10 illustrates an evidence reliability score lexicon, according to one embodiment of the invention.

TABLE 10

| Ordinal Scale Rating Level | Definition Reliability of the Source | Cardinal Interval Scale Rating Level |
|---|---|---|
| Very High 5 | BLUE The situation is, or circumstances are, such that the source, at this reporting date, is believed to have extremely good reliability. | 80 to 100 Midpt = 90 |
| High 4 | GREEN The situation is, or circumstances are, such that the source, at this reporting date, is believed to have quite good reliability. | 60 to <80 Midpt = 70 |
| Moderate 3 | YELLOW The situation is, or circumstances are, such that the source, at this reporting date, is believed to have so-so reliability. | 40 to <60 Midpt = 50 |
| Low 2 | ORANGE The situation is, or circumstances are, such that the source, at this reporting date, is believed to have slightly poor reliability. | 20 to <40 Midpt = 30 |
| Very Low 1 | BLUE The situation is, or circumstances are, such that the source, at this reporting date, is believed to have extremely poor reliability. | 0 to <20 Midpt = 10 |

Definition of "Source": The originating basis from which information is produced. This can include human produced reporting, model produced findings, publications/documents, open source research, etc. In this context, reliability refers to the dependability of the source to produce consistent results (e.g., always on-mark, always off-mark, or sometimes in-between). Factors to consider include (but are not limited to) the dependability of the source, past reporting history, and evidence this source produces the same level of result repeatedly and consistently, with information that is sustainable, over time. The values shown in the right column reflect a measure of the "strength" of the rating. In this case, it reflects a measure of the "strength" of the reliability of the source. The choice of a rating is not arbitrary. The situation or circumstances that support the selection of a rating should be documented by arguments and evidence justifying the basis for the selection.

The one or more pieces of evidence, the evidence credibility lexicon, and the evidence reliability lexicon can be retrieved from a database (e.g., hypotheses evidence database 120 of FIG. 1) or input by a user through a terminal (e.g., computing device 130 of FIG. 1).

The method also involves determining an evidence veracity index (EVI) (e.g. veracity score) for each of the one or more pieces of evidence (Step 440). In one embodiment, the EVI is determined as follows:

$$EVI=(ECS+ERS)/2 \qquad \text{EQN. 12}$$

where EVI is the evidence veracity index, ECS is the evidence credibility score for each piece of evidence and ERS is the evidence reliability score for each piece of evidence.

In some embodiments, a hypothesis veracity score for each piece of evidence is determined. In one embodiment, the hypothesis veracity score is determined as follows:

$$S(x)=25(x-1), \text{ for } 1 \le x \le 5 \qquad \text{EQN. 13}$$

where S(x) is the hypothesis veracity score given the degree that a piece of evidence indicates or contra-indicates the hypothesis on an x equal to 1 to 5 ordinal scale.

In some embodiments, the hypothesis veracity score for each piece of evidence is determined as follows:

$$S(x) = 0 + \begin{cases} 100 \cdot \left(1 - \exp\left(-5.1217 \cdot \left(\frac{x-1}{4}\right)^{2.8854}\right)\right) & \text{if } 1 \le x \le 3 \\ 100 \cdot \left(\exp\left(-5.1217 \cdot \left(\frac{5-x}{4}\right)^{2.8854}\right)\right) & \text{if } 3 \le x \le 5 \end{cases} \qquad \text{EQN. 14}$$

where S(x) is the hypothesis veracity given the degree that a piece of evidence indicates or contra-indicates the hypothesis on an x equal to 1 to 5 ordinal scale. In some embodiments, the strength of trueness evidence score for each piece of evidence is averaged to determine a veracity score (i.e. strength of trueness score) for the hypothesis. Determining a veracity score by an average for the hypothesis allows for a compensatory influence of negative and positive evidence to compete in driving the indicated trueness of a hypothesis.

Figure 5A:
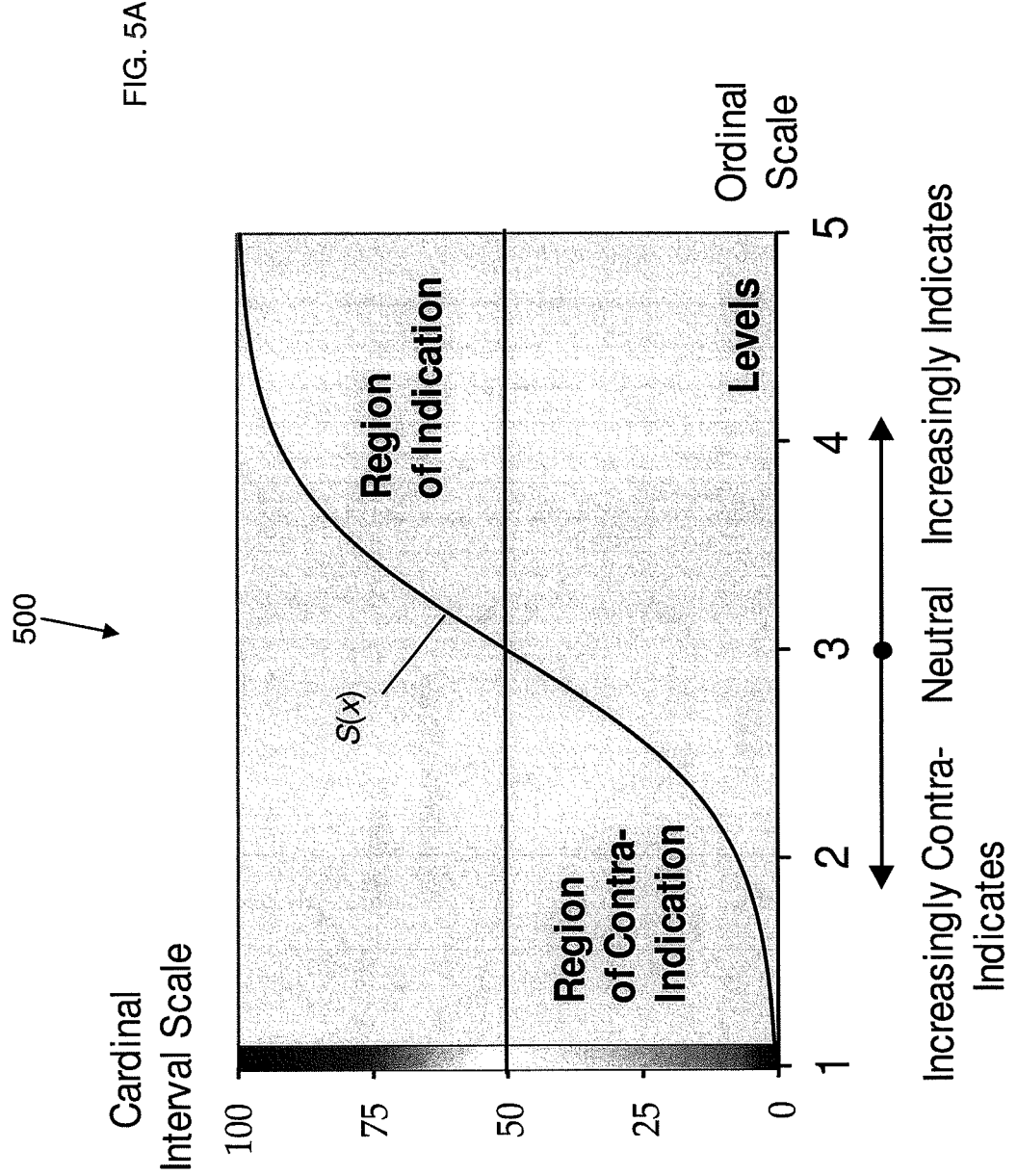
FIG. 5A is a graph of the degree that a piece of evidence indicates and contraindicates a hypothesis.

FIG. 5A is a graph 500 of strength of trueness evidence scores showing regions where the evidence indicates and contraindicates a hypothesis. FIG. 5B is a graph 510 of a hypothesis veracity score showing regions of indication and contraindication for the hypothesis.

Figure 6:
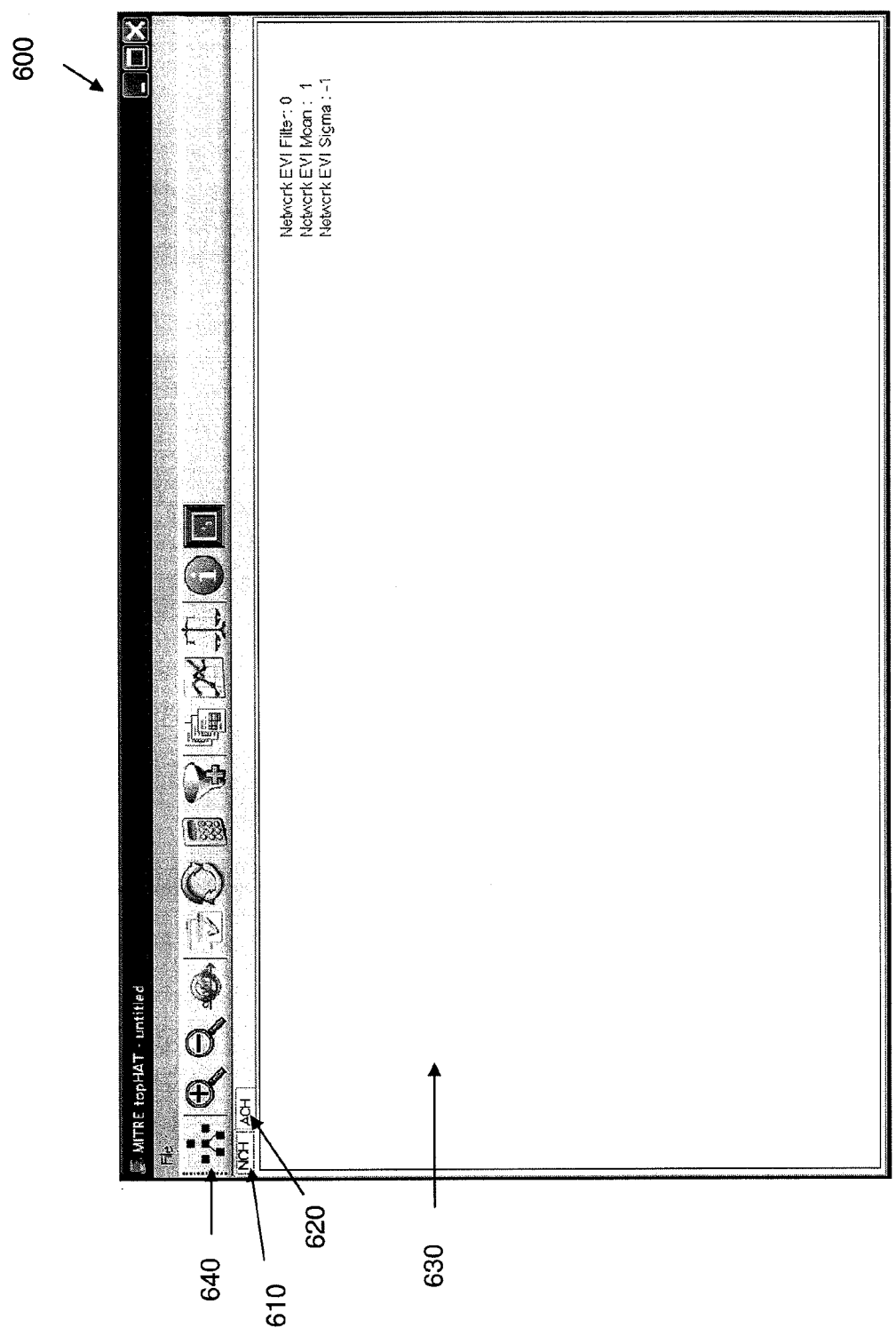
FIGS. 6-11 are screen shots of a graphical user interface to analyze hypotheses.

FIG. 6 illustrates an exemplary network user interface 600 for hypotheses analysis. In this embodiment, the user interface 600 includes a first tab 610 and a second tab 620. The first tab 610 is selected when the hypotheses are non-competing hypotheses. The second tab 620 is selected when the hypotheses are competing hypotheses. In other embodiments, only the first tab 610 or the second tab 620 is present in user interface 600. Whether the first tab 610 or the second tab 620 is present depends on the determination that the analysis is of competing or non-competing hypotheses (e.g., Step 210 as shown above in FIG. 2).

Figure 9:
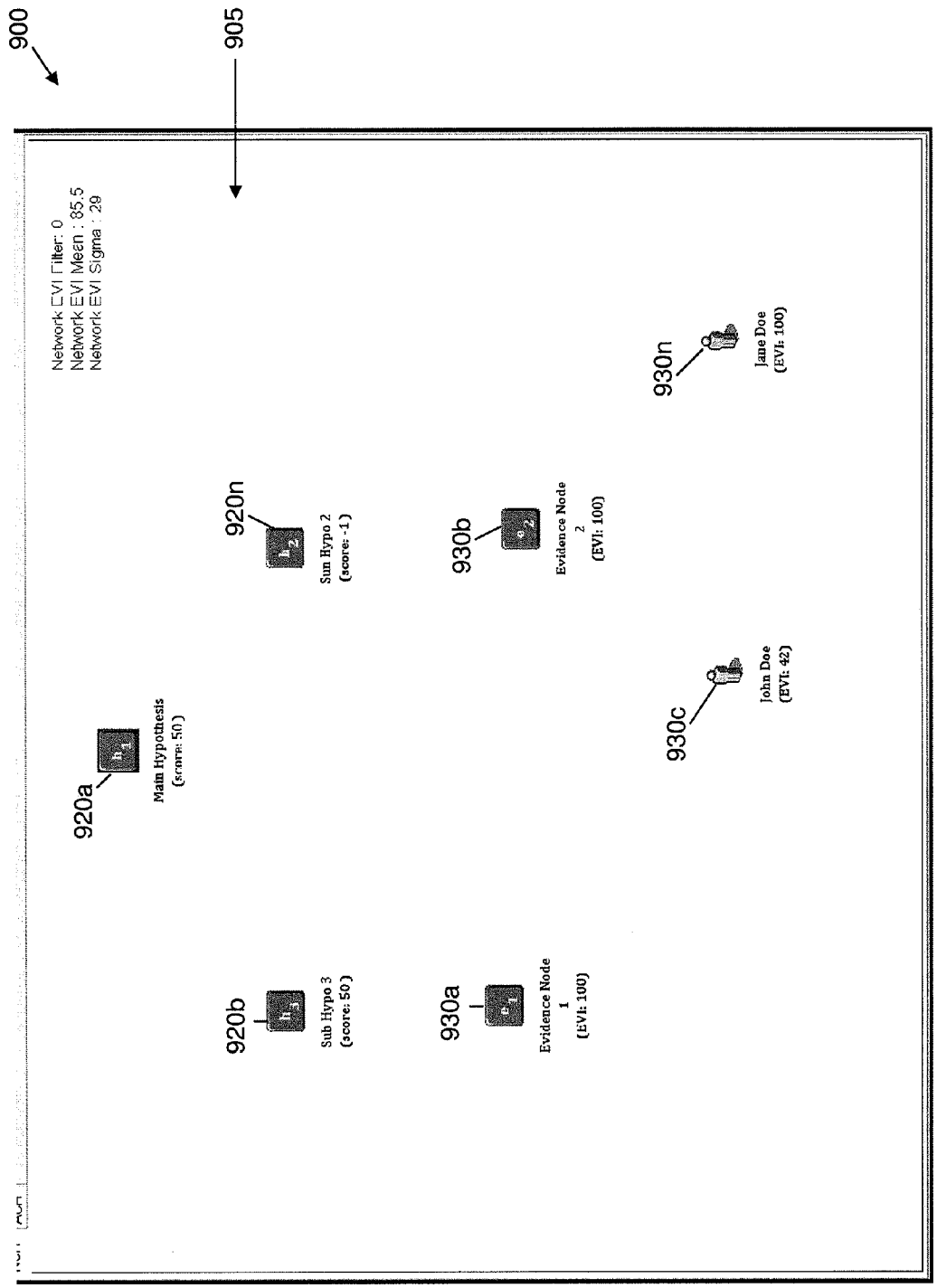

The user interface 600 also includes a first area 630. Before a user inputs hypotheses and evidence into the hypotheses analysis system, the first area 630 is empty. Once the user inputs hypotheses (e.g., hypothesis nodes) and pieces of evidence (e.g., evidence nodes), the first area 630 displays the hypothesis nodes and evidence nodes (e.g., as shown in FIG. 9 below). The first area 630 also displays links between hypothesis nodes and evidence nodes after the user inputs the links (e.g., as shown in FIG. 9 below). The hypothesis nodes and evidence nodes are generally referred to as nodes. User interface 600 includes a first button 640 to input hypothesis nodes and evidence nodes.

Figure 7:
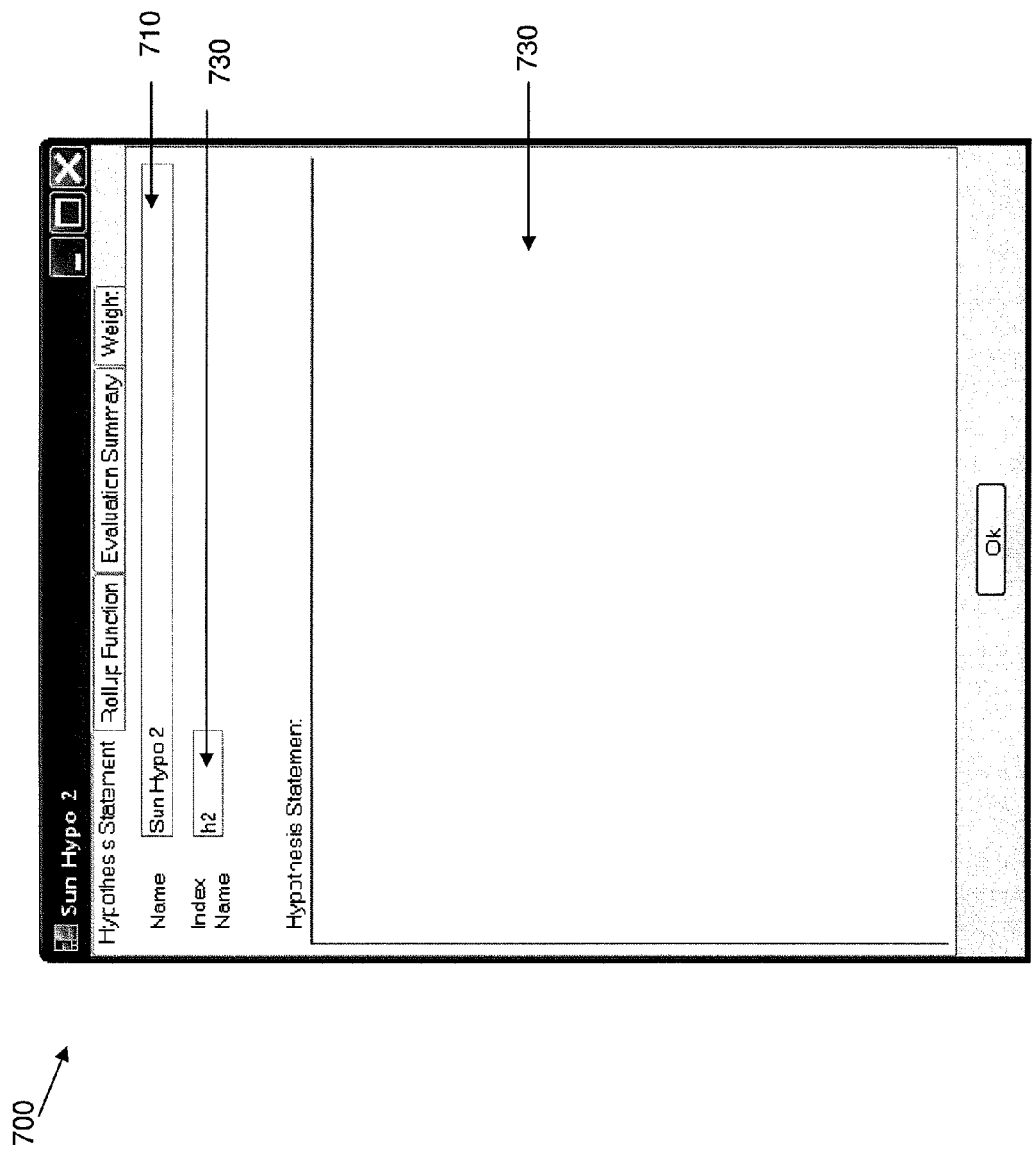

FIG. 7 illustrates an exemplary user interface 700 for a user to input a hypothesis to be analyzed. The user interface 700 includes a first area 710, a second area 720 and a third area 730. The user inputs a name of a hypothesis node in the first area 710. The user inputs an index name of the hypothesis node in the second area 720. The user inputs a statement about the hypothesis node in the third area 730.

Figure 8A:
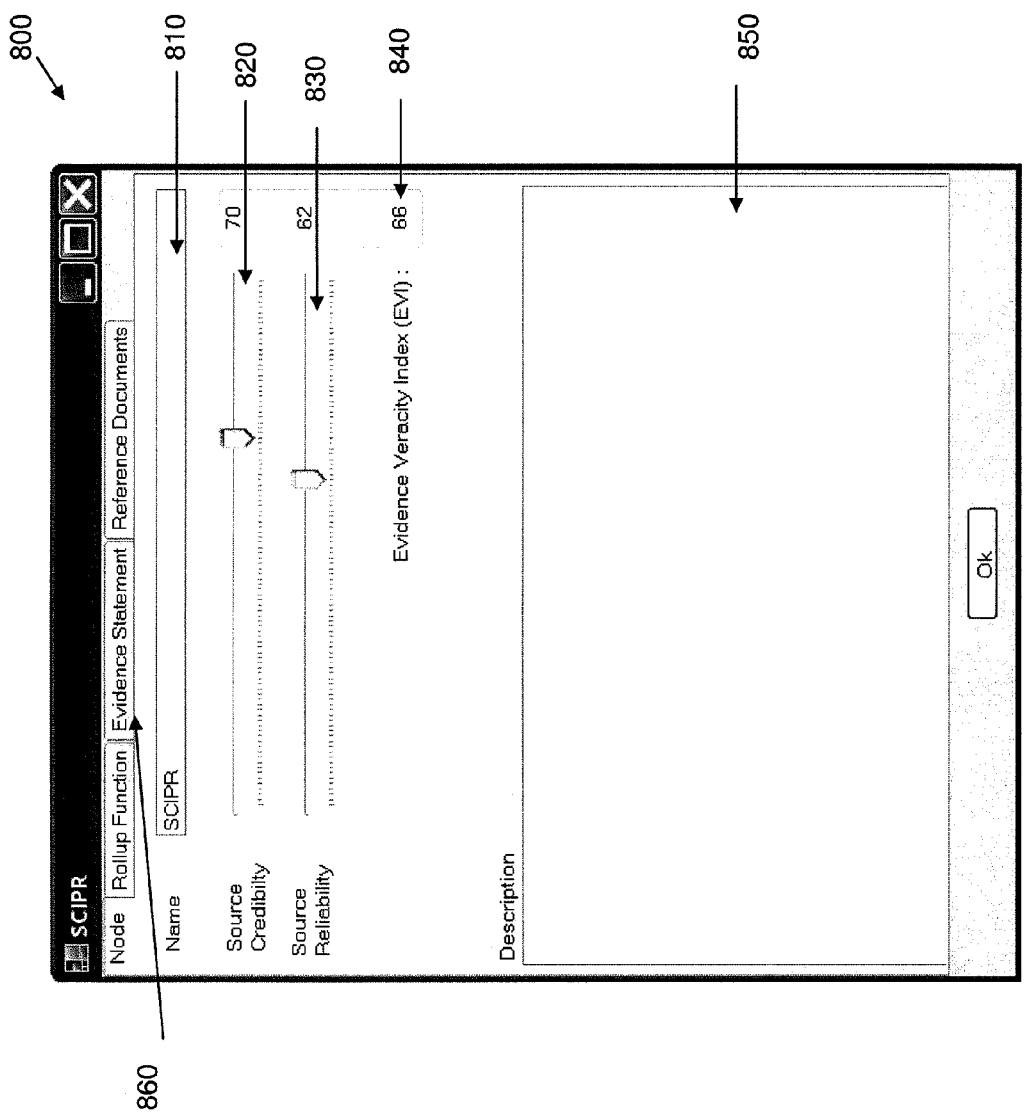
Figure 8B:
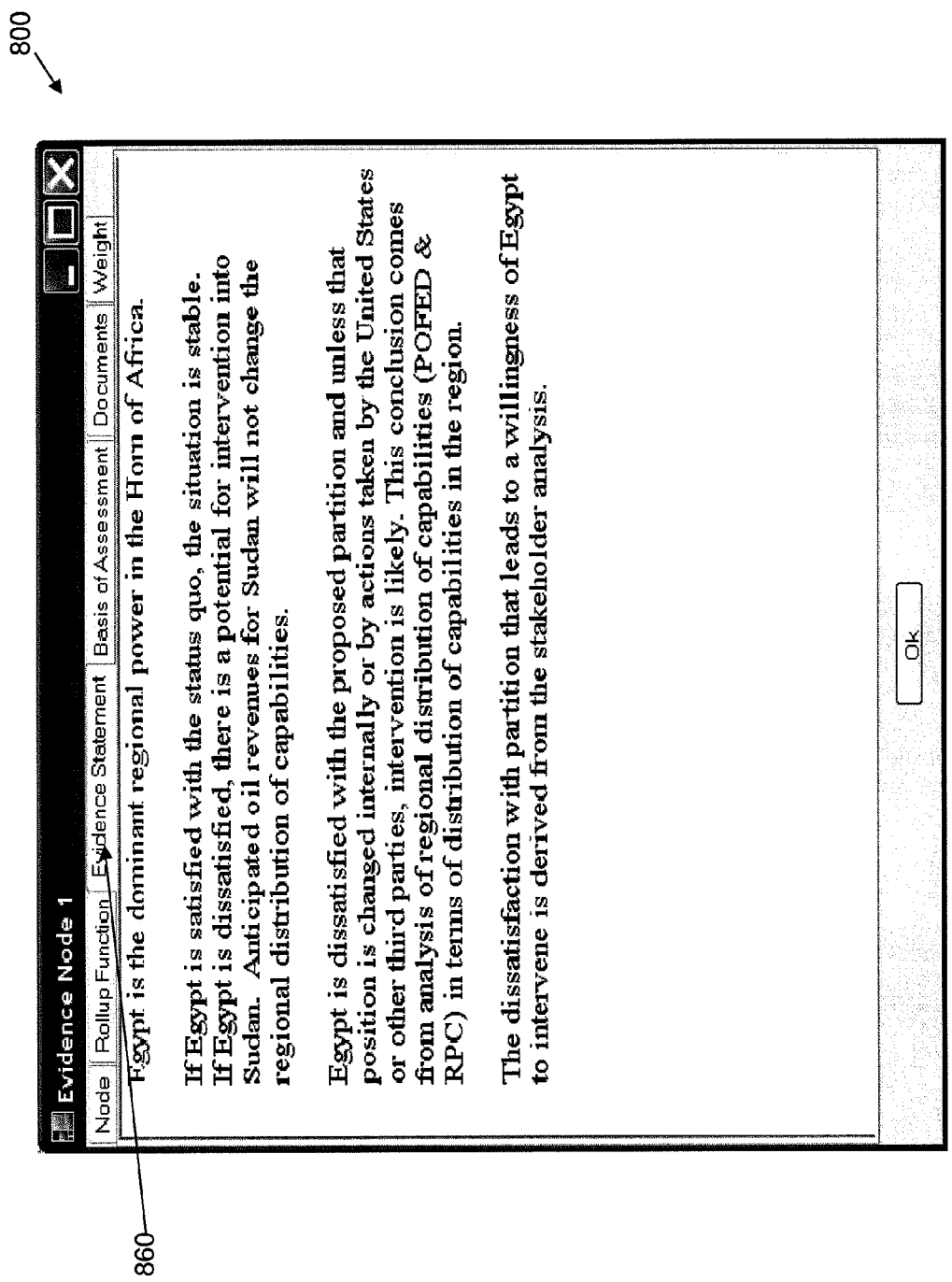

FIG. 8A illustrates an exemplary user interface 800 for a user to input a piece of evidence. The user interface 800 includes a first area 810 to input a name of the piece of evidence to be added. The user interface 800 includes a first slide bar area 820 to input a evidence credibility value (e.g., the source credibility value) and a second slide bar area 830 to input a evidence reliability value (e.g., the source reliability value). The user interface 800 includes a second area 840 that identifies an evidence veracity index (e.g., EVI). The user interface 800 also includes a third area 850 to input a description of the evidence and a first tab 860 to input a statement about the evidence (e.g., an evidence statement). FIG. 8B illustrates the exemplary user interface 800 with first tab 860 selected.

FIG. 9 is a screen shot of the network user interface 900 including hypotheses and evidence. User interface 900 includes the first area 905 that displays one or more hypothesis nodes 920a, 920b, . . . 920n, generally 920, and one or more pieces of evidence nodes 930a, 930b, 930c, . . . 930n. In some embodiments, the one or more pieces of evidence nodes 930 are displayed as a block graphic to indicate that the evidence is a statement and/or a person graphic to indicate the evidence is provided by a particular person.

The one or more hypothesis nodes 920 and the one or more pieces of evidence nodes 930 display the information that was input via the hypothesis node user interface 700 and the evidence node user interface 800. For example, hypothesis node 920n displays the information of a hypothesis name Sun Hypo 2 and the information of a hypothesis index name h2 that correspond to the hypothesis name and the hypothesis index name shown in user interface 700 above in FIG. 7.

Figure 10:
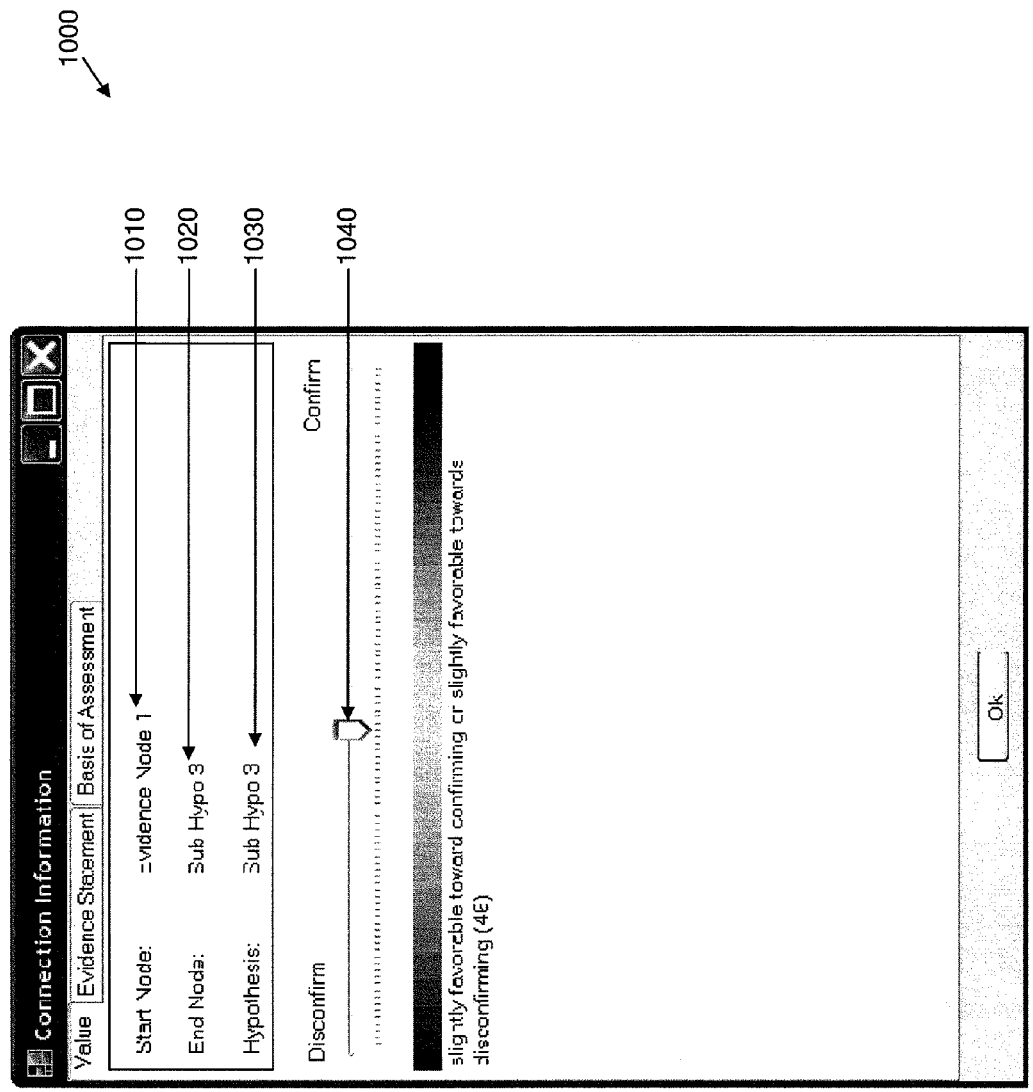

FIG. 10 illustrates an exemplary user interface 1000 to input links between nodes. The user specifies the data to include in the analysis of a particular hypothesis by nodes by inputting a link between the nodes. A hypothesis node can be linked to a data node, two data nodes can be linked to each other and/or two hypothesis nodes can be linked to each other.

The user interface 1000 includes a first area 1010, a second area 1020 and a third area 1030. The user inputs a start node for the link in the first area 1010. The user inputs an end node for the link in the second area 1020. The user inputs the hypothesis the start node and the end node are to contribute to analyzing in the third area 1030. The user interface 1000 also includes a first slide bar area 1040 to input whether the start node and end node confirm (or disconfirm) the hypothesis (e.g., hypothesis data performance value as discussed above in connection with FIG. 2.)

Figure 11:
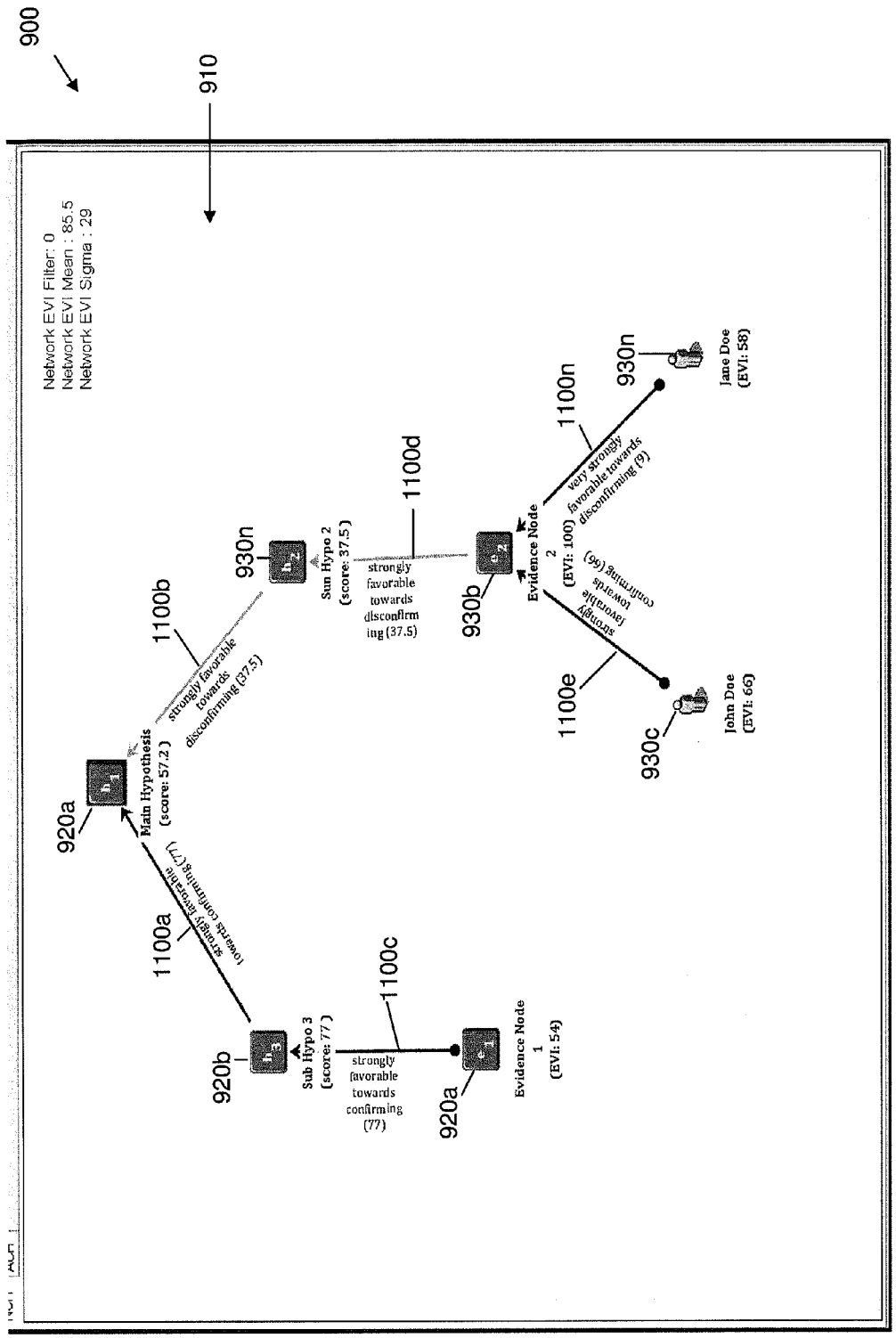

FIG. 11 is a screen shot of the network user interface 900 including the nodes in a linked state. The first area 910 includes the hypothesis nodes 920, the evidence nodes 930 and one or more links 1100a, 1100b, 1100c, 1100d, 1100e, . . . 1100n, generally 1100. The one or more links 900 display information that was input using link input user interface 1000. For example, link 1100c indicates that data node 930a is strongly favorable towards not disconfirming hypothesis node 920b with an evidence veracity score of 77. The information displayed on link 1100c corresponds to the information shown in user interface 1000 of FIG. 10 above.

Figure 12:
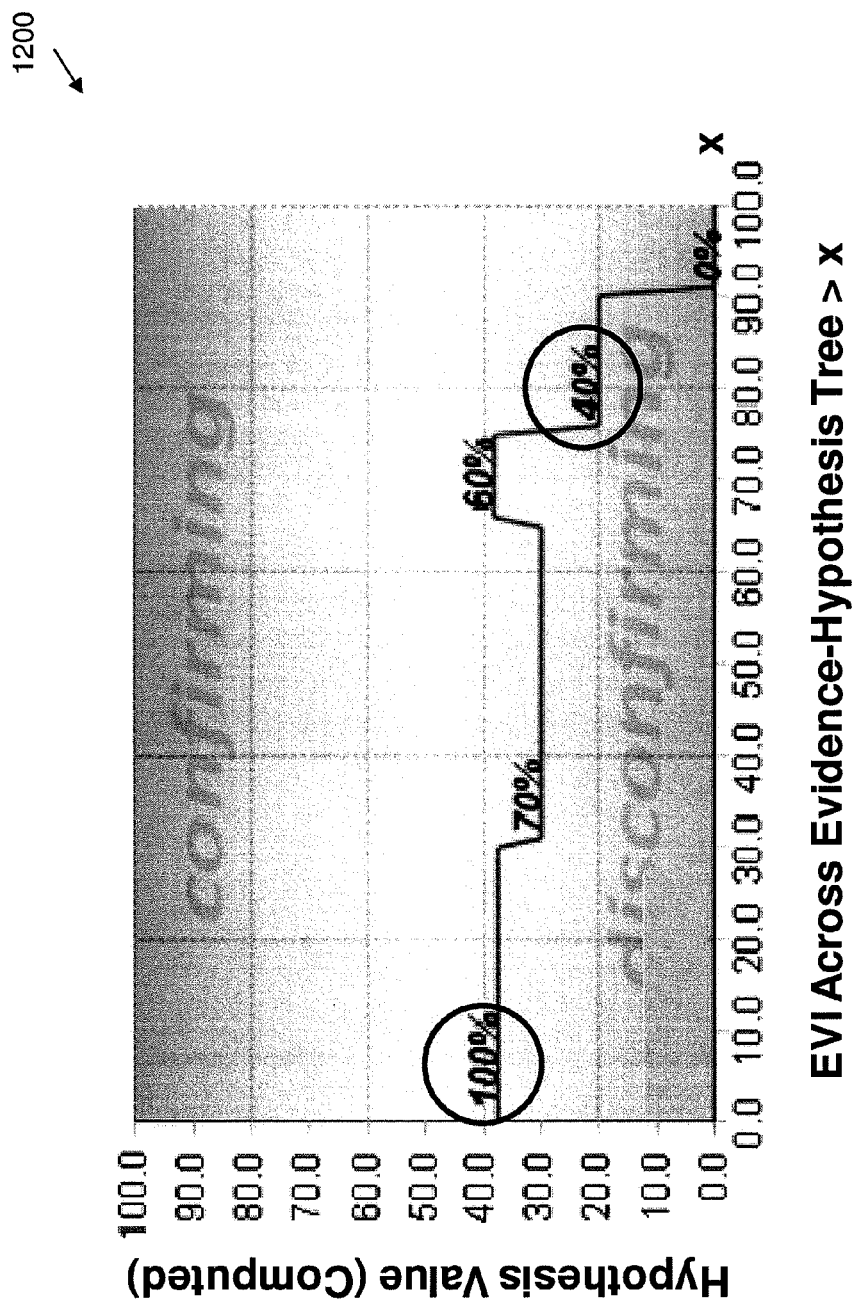
FIG. 12 is an exemplary plot of a change in hypothesis veracity score as a function of a veracity score threshold imposed on each piece of evidence.

FIG. 12 is an exemplary plot 1200 of a change in a hypothesis veracity score as a function of a veracity threshold on the evidence that is included in the analysis. An evidence veracity score can be a function of its relevance and credibility scores. A high evidence veracity score indicates greater confidence in the evidence node. A low evidence veracity score indicates lesser confidence in the evidence node. For example, in FIG. 12, when all evidence nodes (e.g., 100% of the possible evidence nodes) in the tree are included in determining the hypothesis veracity score, the hypothesis veracity score is 38 points. When only evidence nodes with a veracity score of greater than 77 are included in determining the hypothesis veracity score (e.g., 40% of the total possible evidence nodes), the hypothesis veracity score is 20. In FIG. 12, the trueness of the hypothesis, measured by its value, is trending toward the region of contra indication with increasingly higher levels of evidence veracity. Analytic results such as these can provide insights to policy and decision-makers that otherwise may not be seen.

In some embodiments, a veracity score threshold is set. The veracity score threshold specifies a veracity score that all evidence nodes must meet or exceed to be included in the analysis.

In various embodiments, the disclosed methods may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems.

Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

While the invention has been particularly shown and described with reference to specific embodiments, it should be understood by those skilled in the art that various changes in form and detail may be made therein without departing from the spirit and scope of the invention as defined by the appended claims.

The invention claimed is:

1. A computerized method of analyzing a plurality of hypotheses based on evidence and analyzing diagnostic strength of evidence, comprising:
   receiving, by a computing device, one or more a plurality of hypotheses and one or more pieces of evidence;
   determining, by the computing device, whether the one or more plurality of hypotheses are competing or non-competing based on the one or more pieces of evidence, where the one or more pieces of evidence has a corresponding source;
   if the plurality of hypotheses are competing:
      receiving by the computing device, an evidence confirmation value for each of the plurality of hypotheses for each of the one or more pieces of evidence,
      determining, by the computing device, an evidence contribution value of each of the one or more pieces of evidence to confirming or disconfirming each of the one or more plurality of hypotheses, each contribution value is based on all of the evidence confirmation values,
      determining, by the computing device, a diversification index based on all of the evidence confirmation values and the contribution values, the diversification index is a measure of a degree of distinction in each of the one or more pieces of evidence,
      determining, by a computing device, a diagnostic strength value for each of the one or more pieces of evidence based on the contribution value,
      determining, by a computing device, a diagnostic strength value for each of the one or more pieces of evidence based on the contribution value, and
      graphically displaying, by the computing device, for each diagnostic strength value on a display device; and
   if the plurality of hypotheses are non-competing:
      receiving, by a computing device, for each of the one or more pieces of evidence corresponding to the plurality of hypotheses that are non-competing,
         an evidence credibility score that is determined independent of a reliability of the corresponding source to produce consistent results, and
         an evidence reliability score that is determined based upon the reliability of the corresponding source to produce consistent results,
      determining, by a computing device, a veracity score for each of the one or more pieces of evidence corresponding to the plurality of hypotheses that are non-competing based on the evidence credibility and reliability scores, and
      graphically displaying, by the computing device, at least one piece of evidence from the one or more pieces of evidence, at least one hypothesis from the plurality of hypotheses, and a link between the at least of piece of evidence and the at least one hypotheses, the link showing a corresponding determined veracity score on each diagnostic strength value to a display device.

2. The computerized method of claim 1, further comprising: determining, by the computing device, whether one or more of the plurality of hypotheses are true or false based on the veracity score if the plurality of hypotheses are non-competing.

3. The computerized method of claim 1, further comprising:
   receiving, by the computing device, an evidence veracity score for each of the one or more pieces of evidence;
   filtering each of the one or more pieces of evidence having a veracity score below the evidence veracity score threshold;
   determining, by the computing device, a hypothesis veracity score for each of the one or more of the hypothesis; and
   transmitting, by the computing device, each hypothesis veracity score to the display.

4. The computerized method of claim 3 wherein determining the hypothesis veracity score further comprises:
   determining, by the computing device, an extent that an evidence confirmation value is within a region of indication or a region of contra-indication.

5. The computerized method of claim 3, further comprising:
   determining, by the computing device, a mean veracity score based on the veracity scores for each of the one or more pieces of evidence;
   determining, by the computing device, a standard deviation veracity score based on the veracity scores for each of the one or more pieces of evidence; and
   transmitting, by the computing device, the mean veracity score, the standard deviation veracity score and the veracity score threshold to the display.

6. The computerized method of claim 1, further comprising receiving, by the computing device, an evidence statement.

7. The computerized method of claim 1 further comprising translating the evidence credibility score received by the computing device from an ordinal scale to a cardinal scale.

8. The computerized method of claim 1 further comprising translating the evidence reliability score received by the computing device from an ordinal scale to a cardinal scale.

9. The computerized method of claim 1, wherein determining diagnostic strength further comprises:
   receiving, by the computing device, an evidence confirmation value for each of the one or more hypotheses for the one or more pieces of evidence;
   determining, by the computing device, a contribution value of each of the one or more pieces of evidence to confirming or disconfirming each of the one or more hypotheses, based on the evidence confirmation value;

determining, by a computing device, a diagnostic strength for each of the one or more pieces of evidence based on the contribution value.

10. The computerized method of claim 9, further comprising:
    determining, by the computing device, whether each of the one or more hypotheses is indicated or contraindicated based on the evidence confirmation value and the diagnostic strength; and
    transmitting, by the computing device, the indication or contraindication to the display.

11. The computerized method of claim 1 or 2 wherein the veracity score is not based on probability.

* * * * *